No. 635,958. Patented Oct. 31, 1899.
G. W. FISHBACK.
HAY RAKE AND LOADER.
(Application filed Feb. 20, 1897.)
(No Model.) 4 Sheets—Sheet 2.

Witnesses:
Charles H. Spiegel.
N. Smith.

Inventor,
George W. Fishback,
per Wm. Hubbell Fisher,
Attorney.

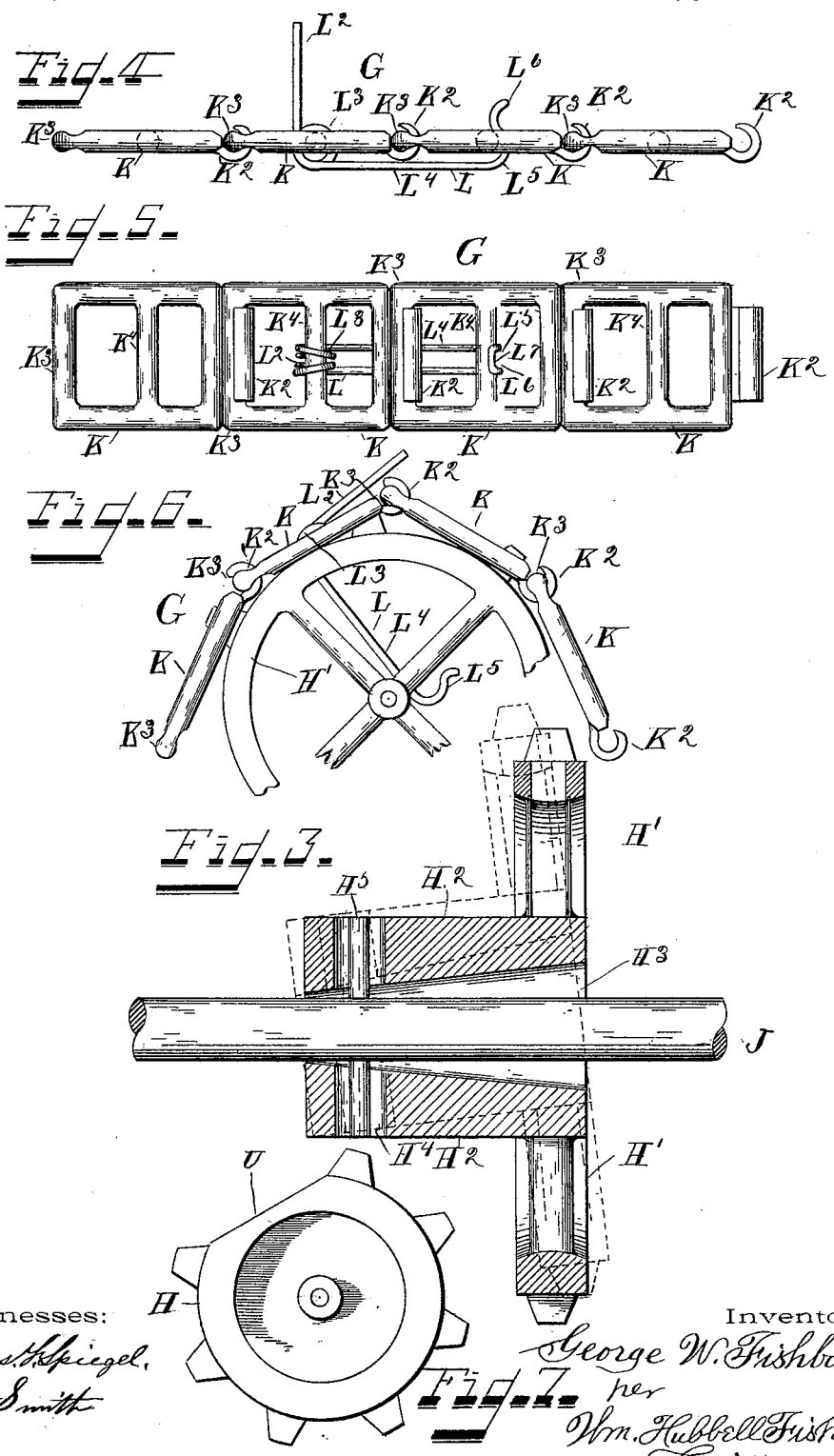

No. 635,958.

G. W. FISHBACK.
HAY RAKE AND LOADER.
(Application filed Feb. 20, 1897.)

Patented Oct. 31, 1899.

(No Model.)

4 Sheets—Sheet 4.

WITNESS
Samuel A. West
K. Smith

INVENTOR
George W. Fishback,
BY
Wm. Hubbell Fisher,
ATTORNEY

UNITED STATES PATENT OFFICE.

GEORGE W. FISHBACK, OF MOUNT CARMEL, OHIO.

HAY RAKE AND LOADER.

SPECIFICATION forming part of Letters Patent No. 635,958, dated October 31, 1899.

Application filed February 20, 1897. Serial No. 624,478. (No model.)

*To all whom it may concern:*

Be it known that I, GEORGE W. FISHBACK, a citizen of the United States, and a resident of the town of Mount Carmel, in the county of Clermont and State of Ohio, have invented certain new and useful Improvements in Hay Rakes and Loaders, of which the following is a specification.

My invention is primarily designed to take grass or hay, grain-stalks, straw, &c., from where they lie in the field and to load any of these upon a moving wagon. My invention is, however, in certain respects applicable to the elevation of such materials from a given point and deposit them on another place, usually higher than the latter, but not necessarily so.

The nature of my invention and the several features thereof and the advantages resulting from their use, conjointly or otherwise, will be apparent from the following description and claims.

Figure 1:
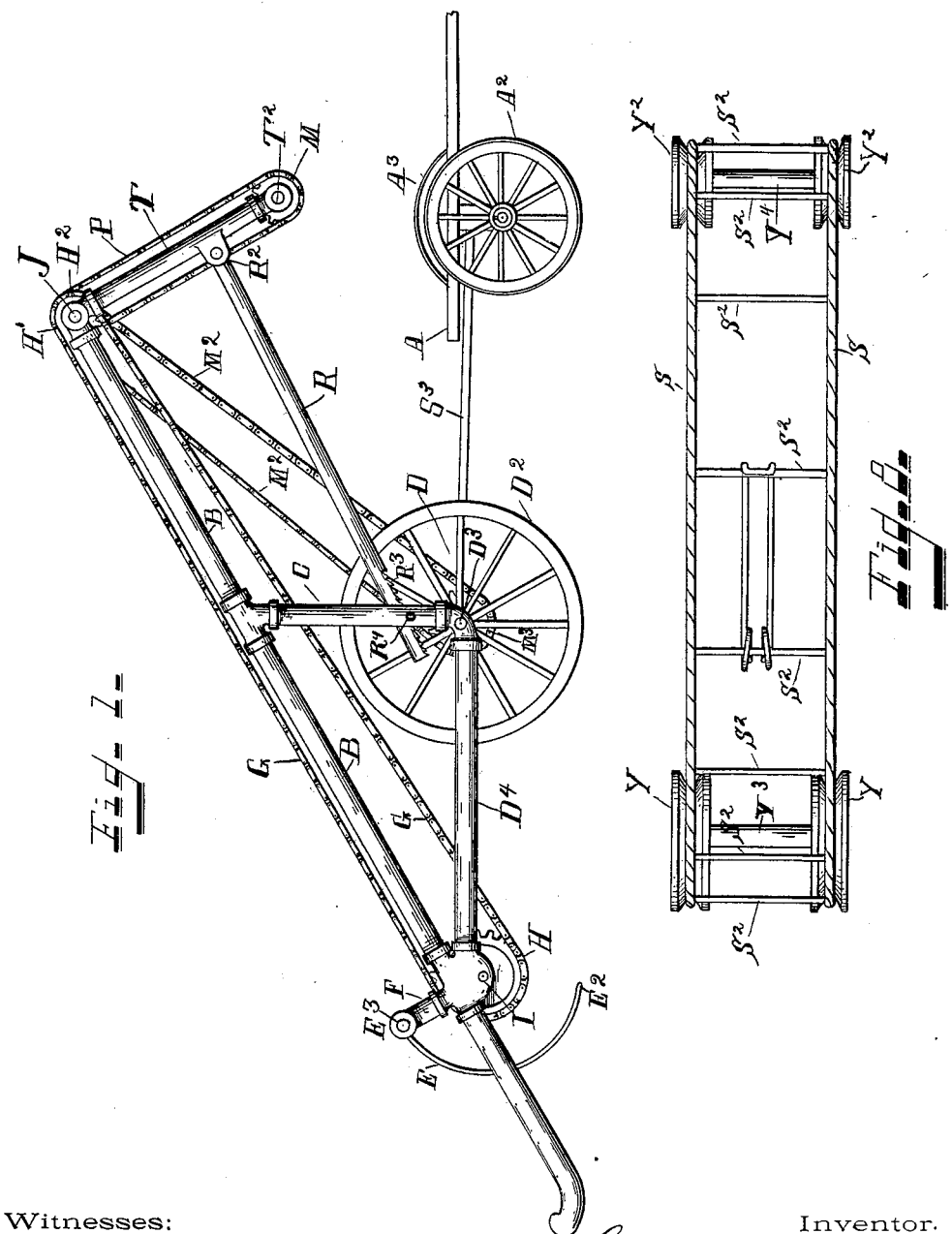
Figure 2:
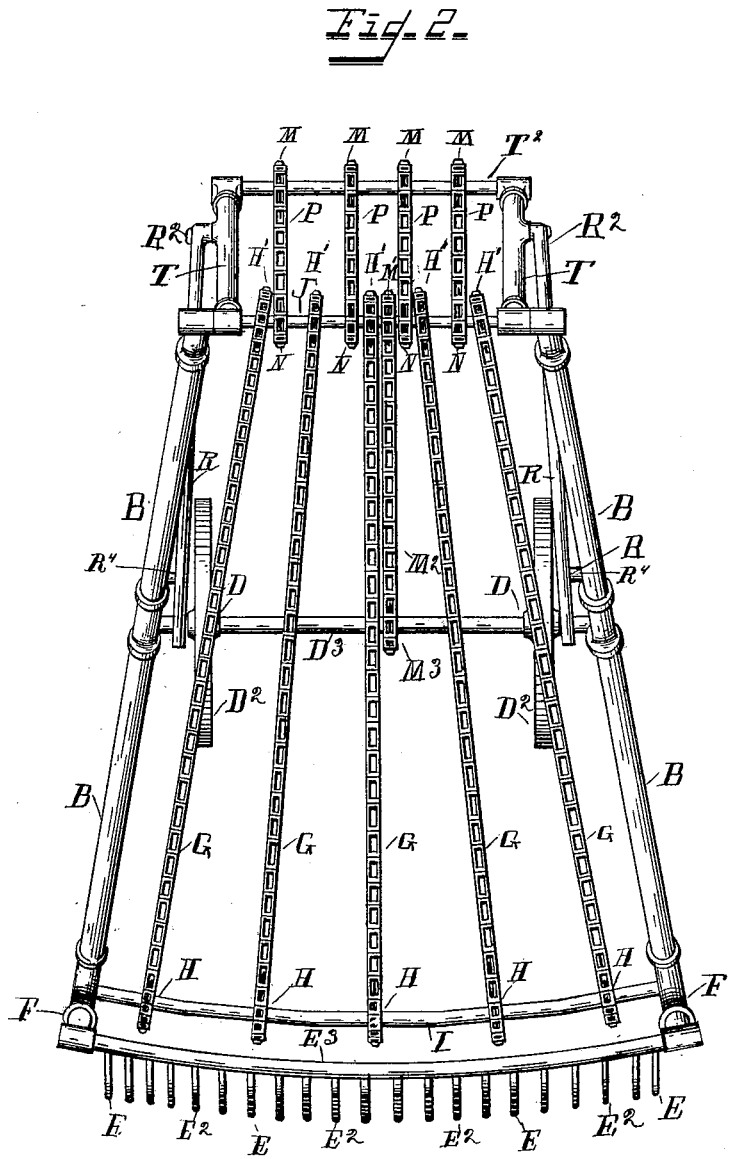
Figure 9:
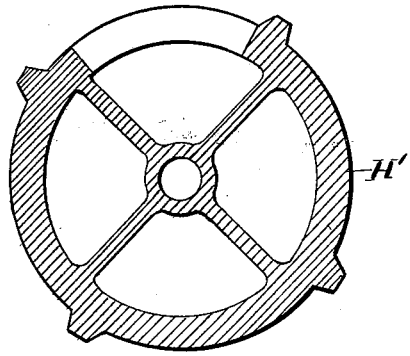
Figure 12:
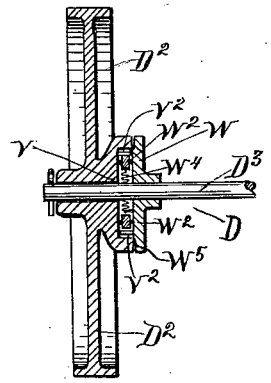
Figure 10:
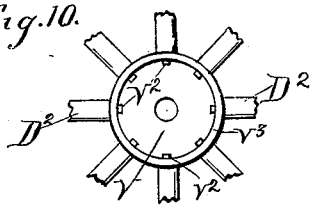
Figure 11:
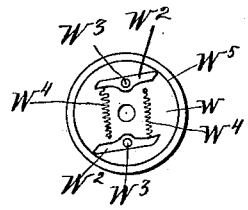

In the accompanying drawings, making a part of this application, and in which similar letters of reference indicate corresponding parts, Figure 1, Sheet 1, is a side elevation of a machine embodying my invention. Fig. 2, Sheet 2, is a top view of the machine shown in Fig. 1. Fig. 3, Sheet 3, is a detail, partly in section, showing the relative construction of one of the upper sprocket-wheels and illustrating the principle of construction of the other upper sprocket-wheels. Fig. 4, Sheet 3, is a side (or edge) elevation of the sprocket-chain and teeth, illustrating the combined construction thereof and the position of the parts when the teeth are in position to operate. Fig. 5 is a top or plan view of the chain and teeth shown in Fig. 4. Fig. 6, Sheet 3, is a side (or edge) elevation of the chain and tooth shown in Fig. 4, but in an altered position, and illustrating the position of the tooth and adjacent links of the chain when passing around or partly around a sprocket-wheel, where the tail of the tooth-piece is allowed to be disengaged from the sprocket-chain. Fig. 7, Sheet 3, is a side elevation of a sprocket-wheel adapted to compel the tail of the hook to engage the sprocket-chain. Fig. 8, Sheet 1, is a plan view of a novel and useful combination of a new chain with my improved tooth. Fig. 9 is a vertical central section of one of the kinds of sprocket-wheels employed in my machine, the section being taken in a plane transverse to the axis of the wheel. Fig. 10 is an elevation of the hub and the adjacent portions of the spokes and one of those wheels of the running-gear which are employed to operate the loading mechanism and showing one style of ratchet affixed thereto. Fig. 11 represents in side elevation one of the suitable kinds of spring-pawl mechanism fast to the shaft and arranged to engage the ratchet of Fig. 10. Fig. 12 represents a vertical central transverse section of a wheel having the ratchet and the pawl mechanism applied thereto and the shaft thereof, the latter being shown in elevation. The wheel and the accompanying parts shown herein and in Figs. 10 and 11 are on a larger scale than in Figs. 1 and 2.

I will now proceed to describe my invention in detail and its more common application—viz., as a loader in the field.

A indicates the rear portion of a platform of a wagon adapted to receive long grass or hay or loose grain-stalks or straw, as the case may be. The wheels and running-gear $A^2$ of this wagon are of any desired style or construction.

$A^3$ indicates the wheel covers or guards of said wagon.

The main frame B of my improved loader is quadrilateral and is made of a strong and stiff material, preferably of iron piping. This frame B is centrally supported on vertical uprights C, preferably made of iron piping, and supported in turn by suitable running-gear D. In the present illustrative instance the running-gear consists of the wheels $D^2$ and an axle $D^3$ thereof, journaled in the frame. These wheels are connected to this axle by means of a ratchet-wheel and pawl in the well-known manner for permitting one wheel to turn more than the other when the loader is being pulled around a curve. The faster wheel imparts a positive rotary movement to the axle. Braces $D^4$, one at each side, preferably of iron piping, extend from the bottom of the frame B to the axle $D^3$.

The frame A and the uprights C and the braces $D^4$ are usually galvanized or painted.

To the lower end of the frame A is connected the upper end of the rake E. When in operation, the free ends of the teeth $E^2$ of the rake are in proximity to the surface of the ground. The upper ends of the teeth $E^2$ are fixed in a rod or shank $E^3$, whose ends are secured pivotally or otherwise in the supports F, which are projections from the sides of the frame at the bottom ends thereof.

In a plane substantially parallel to the upper surface of the frame B B and located just above the same are the upper portions of the endless sprocket-chains G. These chains extend from the lower end portion of said frame to the upper end thereof. At each end of the frame each chain engages its respective sprocket-wheels H H'. The sprocket-wheels H' on the upper shaft J are rotatable therewith. The sprocket-wheels H on the lower shaft I rotate thereon, this latter shaft being stationary. I indicates the lower shaft, and J the upper one. These sprocket-chains are provided with teeth for elevating the hay or other material from the bottom end of frame B to its upper end.

In order to enable the loading mechanism to conveniently deposit the hay, &c., upon the right and desired place of the wagon or equivalent receptacle, a supplemental mechanism is provided, consisting as follows: Frame side pieces T T carry at their lower ends and between them the cross rod or shaft $T^2$, on which the sprocket-wheels M are located. A line of corresponding sprocket-wheels N is located in connection with the upper sprocket-wheels H'. The sprocket-wheels N are for economy of space and power and of material and of labor construction mounted on the shaft J and rotatable therewith. For like reasons the upper ends of the side pieces T T are pivotally connected to the shaft J and are supported by the latter. Endless sprocket-chains P respectively embrace one of the sprocket-wheels N on shaft J and one, M, on the shaft $T^2$. The sprocket-chains are provided with teeth for conveying the hay, &c., from the upper end of the elevator to the receptacle on which the hay, &c., is to be deposited. As will be observed, the frame T T $T^2$ is capable of oscillation, whereby the lower end can thus be moved so as to change its distance from the axle $D^3$, and the inclination of this supplementary conveyer or dropper T T $T^2$ D N can be altered. Preferred means for thus changing the position of this dropper consist as follows: At each side of the machine is a regulating-brace R, and one end of the latter is pivoted at $R^2$ to the frame-piece T on the same side of the machine. At near the other or free end of this brace R the latter is provided with a rack $R^3$, preferably located on the under side thereof, and a given tooth of this rack engages a detent $R^4$ on the side of the upright support C. By disengaging the rack from the detent $R^4$ and moving the brace R forward or backward the conveyer is correspondingly moved forward or backward to the desired position.

The loading mechanism is provided with a suitable shaft device, such as long shafts or tongues $S^3$, connected in any well-known and suitable manner to the axle $D^3$.

In practice on the field the draft device is connected to the wagon, preferably to the rear wagon-axle, substantially as shown.

I have conceived the idea of not only raking the hay, &c., in a given trip over the field from an area whose width is not only as wide as the load of hay, grain, or straw to be loaded, but much wider than the same. I accomplish this important result as follows: I make the lower end of the elevating apparatus very broad, as shown. The upper end of the elevator is of a width much less than that of the load to be made on the wagon. The sprocket-chains G are made to converge as they approach the upper end. To accomplish this much-to-be-desired construction and render it operative, I have devised a sprocket-wheel to meet the needs of this novel combination. I will now describe this wheel and its connection with the shaft on which it is located, and in this connection see also Fig. 3.

The sprocket-wheel H' is provided with an extended hub $H^2$ of considerable thickness. The hub has a central passage $H^3$, and this passage at one end is of the size of the shaft I, upon which the wheel is located, and the passage gradually (and concentrically with the shaft) enlarges to the other end of the hub. This passage $H^3$ is therefore of a conical shape, and the inclination of its sides is substantially that which is necessary to allow the sprocket-wheel to change its position with reference to the shaft in order that the plane of the wheel may be in alinement with the plane of the endless sprocket-chain that it carries.

The sprocket-wheel H' is compelled to turn with its shaft J by means of the pin $H^5$, fixed to the shaft and located in the opening $H^4$ of the hub $H^2$ of the wheel H'. For the purpose of equalizing the pressure and strain upon the hub $H^2$ and the shaft the pin $H^5$ will project from the shaft in two directions—viz., at opposite sides of the shaft, as shown—and each portion of the pin is received in an opening $H^4$ of the hub. To enable the hub and wheel to duly change its position on the shaft, as is necessary on account of the angle which the plane of the sprocket-chain makes with the axis of the shaft, I form the opening $H^4$ wider in the direction of the axis of the hub than the thickness of the pin. Transversely—viz., in the direction of the rotation of the shaft—the opening is of a width to closely fit the pin. When the shaft revolves, the pin moves with it and rotates the hub $H^2$ and wheel H'. The sprocket-chain engaging the points or teeth of the sprocket-wheel H', as shown, holds the latter in alinement with itself. As a consequence the wheel, as to any specific portion, is continually changing its position in regard to the shaft J, yet the wheel as a wheel is always in the same position relative to the shaft. The inclined shape of the interior axial opening $H^3$ of the hub allows the side of the opening for its entire length to rest against the shaft, thereby bracing the wheel and keeping it in its proper position and diminishing the wear on both hub and axle. The lower shaft I is constructed so that the axis of the shaft at the point where a given sprocket-wheel rotates thereon is at right angles to the length of the sprocket-chain on said wheel, and consequently at right angles to the plane of the said wheel. In case the shaft I were straight, as shaft J is, then the wheels would be made like those heretofore described on shaft J.

In Fig. 3 the dotted lines indicate the position the hub will assume when located on shaft J at the right-hand side of a vertical plane passing through the longitudinal center of the machine and illustrate the operation of the wheel. Its changes of position when located on the other half of the shaft J—viz., to the left of the middle longitudinal line of the vehicle—or when located above on the shaft J are obvious to any skilled mechanic, and further description thereof will be unnecessary. I have already mentioned that in connection with the sprocket-chains there are teeth for conveying the hay or grain upward from the rake to the top of the elevator.

The sprocket-chains of the supplemental mechanism or dropper are provided with teeth for conveying the hay or grain down from the top of the elevator to the place upon or over the receptacle where said material is to be deposited.

The preferred form of teeth and their combination with their respective chains are of my invention and will now be described.

The ends of the links K are respectively connected in any desired manner, in the present illustrative instance by hooks $K^2$, the hook of one link engaging by embrace the adjacent end $K^3$ of the next link and allowing one link to oscillate with reference to the other. Each link at its midlength is provided with a rounded cross-bar $K^4$. On one of these cross-bars $K^4$ is journaled a tooth L. This tooth consists of the following constituents—viz., a tooth proper, $L^2$, a journal-eye $L^3$, a long shank $L^4$, a hook $L^5$, a toothed extension $L^6$, and a cross-piece $L^7$. The tooth may be made in various ways. Where the tooth is made in one piece of sheet metal or the like, the main features are those described, omitting the mention of the end $L^7$.

For purposes of lightness, economy, convenience, and of obtaining a simple and easy elastic action I construct the tooth of spring-wire and make it to consist of two parallel portions, the one a facsimile of the other. Each part has a tooth $L^2$. The wire is then coiled around the bar $K^4$ and extends thence in a straight line to the bar $K^4$ of the next link K, substantially as shown in Figs. 4 and 5 of the drawings. This straight piece or shank terminates in a hook $L^5$, and the latter ends in an extension-piece $L^6$. As both of these parallel constructions of wire are connected together at the terminations of the pieces $L^6$, the whole is preferably constructed of a single piece of wire, and hence the piece $L^7$, connecting the terminations of the said pieces $L^6$, will be integral with the pieces $L^6$.

From the foregoing description and Fig. 6 of the drawings it is evident that the uplifting or breaking of a joint, as $K^2$ $K^3$, of the chain between the ends $L^2$ and $L^5$ of the tooth will shorten the chain there, whereupon the hook $L^5$ will be unloosed from its link-bar $K^4$ and be free to come away, and when placed as in Fig. 6 its gravity will cause it to fall and assume the position shown in Fig. 6. After the chain is straight and the hook $L^5$ is locked to its bar, as shown, the tension of the straight chain will keep the entire tooth in place, as shown in Figs. 4 and 5.

Power is communicated to the shaft J through the agency of a sprocket-wheel $M'$ on said shaft and an endless sprocket-chain $M^2$, engaging said sprocket-wheel and at the other end of the loop engaging a sprocket-wheel $M^3$ on a power-shaft, and in case of a field loader the axle $D^3$ is preferably utilized as the power-shaft. Thus the advance of the loading mechanism over the field will operate the chains and teeth of the machine. One suitable description of such ratchet-and-pawl connections is as follows: At the hub of the wheel D is affixed a plate V, preferably integral therewith and concentric with the hub and having teeth $V^2$. The wheel travels loose on the shaft $D^3$. Fixed on the shaft $D^3$ is a concentric disk W, having pawls $W^2$, respectively pivoted at $W^3$ to the disk. These pawls are each elastically held so as to move behind each adjacent ratchet-tooth $V^2$ as the latter passes such pawl in the usual manner for compelling the shaft $D^3$ to rotate forward with the rotation of that one of the wheels $D^2$ which at any time travels the faster. The disk W is located close to the hub, and the pawls lie within the circle of the ratchet-teeth $V^2$, substantially as indicated in Fig. 12. The teeth are preferably arranged in connection with an annular flange $V^3$ of the hub, which flange covers the outer circumferential edge of the space or chamber $W^5$ in which the ratchet-teeth and pawls act, and the disk W, brought close against this chamber and the vertical edge of the annular flange $V^3$, operates to keep out from the ratchet-teeth and pawls and springs the dust and dirt which might otherwise clog their proper action. The preferred elastic means for operating the pawls $W^2$ are the springs $W^4$, as shown.

The mode in which my machine operates, in general, is as follows: The machine is coupled in proper relation to the wagon by the draft device $S^3$ and the wagon started over the field. As the machine follows the wagon, the rakes E gather the hay or other material to be loaded from the field and crowd it against the teeth L of the moving chains G. By these teeth the material is carried up to the top of the loader and delivered onto the teeth of the conveyer and by the latter carried forward and deposited on the wagon. At intervals the inclination of the dropper and the position of its lower end are adjusted in relation to the location of the material on the wagon by means of the set braces R until the wagon is properly loaded. The work of gathering the material to be loaded is very rapidly accomplished, as the track or swath from which the material is gathered is a very wide one, owing to the novel and valuable capacity of the machine, as already specified.

A modification of the sprocket-chain, and one valuable not only in connection with this machine, but also with harvesting-machines, is as follows: S S indicate parallel wire ropes, and $S^2$ cross-bars between them, extending from one rope across to the other. On certain of these cross-bars at suitable intervals a tooth is located, and when it is of the kind hereinbefore described it will be pivoted on one cross-bar and its tail engage another, substantially as shown in Fig. 8. Then passage around the wheels Y and $Y^2$ of shafts $Y^3$ and $Y^4$ will operate to alternately disengage and engage the tail of the tooth with a cross-bar.

To enable the tail of a tooth to drop, a groove is present in the periphery of the upper sprocket-wheels H', and to enable the tail of the tooth to be caused to engage a cross-bar of the sprocket-chain an extended flat place U in a depression of each lower sprocket-wheel H is present, as shown in Fig. 7, the flat place being preferably central in relation to the side planes of the wheel.

What I claim as new and of my invention, and desire to secure by Letters Patent, is—

1. The combination of a sprocket-chain and a tooth pivoted on a cross-bar of the chain, and having a tail adapted to engage another cross-bar of the chain, and a sprocket-wheel having a slot or opening extending into the wheel, from the periphery thereof, to receive the tail, when the tooth is not to operate, substantially as and for the purposes specified.

2. The combination of a sprocket-chain and a tooth pivoted on a cross-bar of the chain, and having a tail adapted to engage another cross-bar of the chain, and a sprocket-wheel having a flat place to engage the tail of the latter and to compel its tooth to engage its cross-bar, and also a slot or opening from the periphery into the wheel to receive the tail, when out of operation, substantially as and for the purposes specified.

3. In a toothed sprocket-chain, the combination of the links K, and a tooth having the tooth part $L^2$, a journal bearing or eye $L^3$, a shank $L^4$ and a hook $L^5$, the shank spanning one joint of the chain, substantially as and for the purposes specified.

4. In a toothed sprocket-chain, the combination of the links K, having cross-bars $K^4$, and a tooth L having the tooth part $L^2$, journal-eye $L^3$ (embracing one of said cross-bars), a shank $L^4$, and a hook $L^5$ capable of engaging the cross-bar of another link, substantially as and for the purposes specified.

5. In a toothed sprocket-chain, the combination of the links K, and a tooth having the tooth part $L^2$, a journal bearing or eye $L^3$, a shank $L^4$, and a hook $L^5$, the shank spanning one joint of the chain, and the terminal piece $L^6$, substantially as and for the purposes specified.

6. In a toothed sprocket-chain, the combination of the links K, having cross-bars $K^4$, and a tooth L having the tooth part $L^2$, journal-eye $L^3$ (embracing one of said cross-bars), a shank $L^4$, and a hook $L^5$, capable of engaging the cross-bar of another link, and the piece $L^6$ at the end of said hook, substantially as and for the purposes specified.

7. In a toothed sprocket-chain, a skeleton hook, composed of two parallel portions, made of rod or wire, each of which portions contains a tooth portion $L^2$, an eye $L^3$, for pivotal connection with a link, and constructed by one or more coils of the wire, a shank $L^4$, and a hook $L^5$, and a bridge or piece $L^7$ connecting said parallel portions, substantially as and for the purposes specified.

8. In a toothed sprocket-chain, a skeleton hook, composed of two parallel portions, made of rod or wire, each of which portions contains a tooth portion $L^2$, an eye $L^3$, for pivotal connection with a link, and constructed by one or more coils of the wire, a shank $L^4$, and a hook $L^5$, and the terminal $L^6$, and a bridge or piece $L^7$ connecting said parallel portions, substantially as and for the purposes specified.

9. The combination of a sprocket-chain and a tooth pivoted on a cross-bar of the chain, and having a tail adapted to engage another cross-bar of the chain, and a sprocket-wheel having a flat place to engage the tail of the tooth and compel the latter to engage its cross-bar, substantially as and for the purposes specified.

10. In an elevator, the combination of the upper shaft, and the longer lower axle, extending in a curve struck from a point above and beyond the upper shaft, and sprocket-wheels rotating loosely on the lower axle, and rotating with the upper shaft, and sprocket-chains engaging these wheels, and converging as they approach the upper shaft, the sprocket-wheels on the upper shaft being adapted to vary the inclination of the plane of their rotation to keep in alinement with the sprocket-chains which they respectively carry, independently of the direction of the axis of the shaft, substantially as and for the purposes specified.

GEORGE W. FISHBACK.

Attest:
RAYMOND RATLIFF,
B. F. DOWNER.